United States Patent
Savarit et al.

(10) Patent No.: US 10,657,829 B2
(45) Date of Patent: May 19, 2020

(54) METHOD OF CALCULATION BY A FLIGHT MANAGEMENT SYSTEM OF A TRAJECTORY EXHIBITING IMPROVED TRANSITIONS

(71) Applicant: THALES, Courbevoie (FR)

(72) Inventors: Vincent Savarit, Toulouse (FR); Franck Paruit, Roquettes (FR); Yohann Combes, Leguevin (FR)

(73) Assignee: THALES, Courbevoie (FR)

( * ) Notice: Subject to any disclaimer, the term of this patent is extended or adjusted under 35 U.S.C. 154(b) by 241 days.

(21) Appl. No.: 15/632,205

(22) Filed: Jun. 23, 2017

(65) Prior Publication Data
US 2018/0012502 A1    Jan. 11, 2018

(30) Foreign Application Priority Data
Jul. 7, 2016   (FR) ...................................... 1601061

(51) Int. Cl.
*G08G 5/00* (2006.01)
*G01C 23/00* (2006.01)

(52) U.S. Cl.
CPC ........... *G08G 5/0047* (2013.01); *G01C 23/00* (2013.01); *G08G 5/0021* (2013.01); *G08G 5/0034* (2013.01); *G08G 5/0039* (2013.01)

(58) Field of Classification Search
CPC .. G08G 5/0047; G08G 5/0021; G08G 5/0034; G08G 5/0039; G01C 23/00
See application file for complete search history.

(56) References Cited

U.S. PATENT DOCUMENTS

2006/0235581 A1* 10/2006 Petillon ................. B64D 45/04
701/3
2010/0017113 A1* 1/2010 Artini .................... G01C 5/005
701/3

(Continued)

FOREIGN PATENT DOCUMENTS

| FR | 2 916 287 A1 | 11/2008 |
| WO | 2008/054914 A2 | 5/2008 |

OTHER PUBLICATIONS

Randy Walter, "The Avionics Handbook, Chapter 15: Flight Management Systems," The Avionics Handbook, Jan. 1, 2001, pp. 1-25, XP002648022.

*Primary Examiner* — Thomas E Worden
(74) *Attorney, Agent, or Firm* — Baker & Hostetler LLP

(57) ABSTRACT

A method of calculation, by a flight management system termed FMS, of a trajectory flown by an aircraft comprises the steps, calculated by the FMS, of: for at least one transition of the trajectory arising from the flight plan: 1) determining an initial transition comprising at least one arc exhibiting a single initial turning radius, 2) determining an initial trajectory incorporating the initial transition, 3) determining for each parameter a plurality of predicted values of the parameter in the course of the initial transition, 4) determining a plurality of ordered subdivisions of the arc of the initial transition according to a predetermined criterion, 5) determining, for each subdivision, an associated turning radius, 6) determining an improved transition on the basis of the ordered subdivisions and of the successive associated turning radii, 7) determining an improved trajectory incorporating the improved transition, 8) displaying the improved trajectory to a pilot of the aircraft.

14 Claims, 10 Drawing Sheets

(56) References Cited

U.S. PATENT DOCUMENTS

2015/0276411 A1* 10/2015 Savarit .................. G01C 21/00
  701/467
2019/0103029 A1* 4/2019 Valls Hernandez ........................
  G08G 5/0034

* cited by examiner

METHOD OF CALCULATION BY A FLIGHT MANAGEMENT SYSTEM OF A TRAJECTORY EXHIBITING IMPROVED TRANSITIONS

CROSS-REFERENCE TO RELATED APPLICATIONS

This application claims priority to foreign French patent application No. FR 1601061, filed on Jul. 7, 2016, the disclosure of which is incorporated by reference in its entirety.

FIELD OF THE INVENTION

The invention lies in the field of aircraft flight management systems (FMS). More particularly the invention relates to a method for calculating a lateral trajectory some of whose transitions (changes of direction of the aircraft) are improved.

BACKGROUND

A flight plan is the detailed description of the route to be followed by an aircraft within the framework of a planned flight. The flight plan is usually managed aboard civil aeroplanes by a system referred to as a "Flight Management System", which will be called FMS hereinafter, which places the route to be followed at the disposal of the flight personnel and at the disposal of the other on-board systems. Among other things, these systems allow navigation assistance, by displaying information which is useful to pilots, or else by communicating flight parameters to an automatic piloting system.

FIG. 1 presents an overview illustrating the structure of an FMS known from the prior art. A system of FMS type 10 has a man-machine interface 12 comprising for example a keyboard and a display screen, or else simply a display touchscreen, as well as at least the following functions, described in ARINC standard 702:

- Navigation (LOCNAV) 101, for performing optimal location of the aircraft as a function of geo-location means 130 such as satellite based geo-positioning or GPS, GALILEO, VHF radionavigation beacons, inertial platforms. This module communicates with the aforementioned geo-location devices;
- Flight plan (FPLN) 102, for inputting the geographical elements constituting the skeleton of the route to be followed, such as points imposed by the departure and arrival procedures, waypoints, airways;
- Navigation database (NAVDB) 103, for constructing geographical routes and procedures on the basis of data included in the bases relating to the points, beacons, interception legs or altitude legs . . . ;
- Performance database, (PRFDB) 104, containing the craft's aerodynamic and engine parameters;
- Lateral trajectory (TRAJ) 105, for constructing a continuous trajectory on the basis of the points of the flight plan, complying with the performance of the aircraft and the confinement constraints (RNP); the functions forming the subject of the present invention affect inter alia this part of the calculator.
- Predictions (PRED) 106, for constructing an optimized vertical profile on the lateral trajectory.
- Guidance (GU ID) 107, for guiding the aircraft in the lateral and vertical planes on its three-dimensional trajectory, while optimizing its speed. In an aircraft equipped with an automatic piloting device 11, the latter can exchange information with the guidance module 107;
- Digital data link (DATALINK) 108 for communicating with the control centres and other aircraft 13.

The flight plan is entered by the pilot, or else by data link, on the basis of data contained in the navigation database. A flight plan is devised on the basis of a list of waypoints and of procedures (departure, arrival, airways, missions) stored in the navigation database 130.

The pilot thereafter inputs the aircraft parameters: mass, flight plan, span of cruising levels, as well as one or a plurality of optimization criteria, such as the CI.

The flight plan comprises an ordered series of segments (usually called LEGs) defined by an aeronautical standard. A segment corresponds to a directive for calculating an elementary trajectory. The trajectory arising from the flight plan PV is constructed gradually from segment to segment on the basis of the directives contained in each segment (inter-waypoint geometry defined by these segments), of the performance of the aeroplane, of constraints of any type (altitude, speed, time, slope) and of the thrust and speed directives (which are used for the calculation of the turning radius). In commercial aeronautics the ARINC 424 international standard defines various types of "LEG" or segment, each type corresponding to a kind of data required for the calculation of the elementary trajectory corresponding to the type, for example directives to be followed in terms of position, altitude, heading or route.

More specifically, the modules TRAJ 105 and PRED 106 calculate respectively the lateral trajectory and the vertical profile, that is to say the flight profile in terms of altitude and speed, which for example minimizes the optimization criterion.

Each segment thus generates a portion of trajectory or elementary trajectory. This elementary trajectory corresponds to a geometric element which can be a straight section, an arc, typically a circular arc, or combinations of straight section and arcs.

Furthermore a trajectory portion making it possible to link the elementary trajectories corresponding to two nonaligned consecutive segments is termed a transition T. The existence of a transition between two segments therefore necessarily gives rise to a turning of the aircraft during the transition.

On the basis of the complete calculation of the trajectory, the FMS determines "predictions" (carried out by the module PRED) which correspond to values of key parameters of the trajectory along the latter, that is to say for various values of the curvilinear abscissa x of the trajectory. Typically these parameters are: speed of the aircraft relative to the surrounding air mass termed CAS (for Calibrated Air Speed), Altitude of the aircraft, Wind (defined by vector).

The FMS can, on instruction from the pilot, slave the aircraft automatically to the calculated trajectory.

A transition is characterized by a transition start point, which may be a point calculated by the FMS or the real-time position of the aircraft, and an end-of-transition item of information, which may be a point, a heading, or a combination of a point which must be overflown according to a certain heading. According to the prior art the curved part of the transition takes the form of one or more circular arcs of amplitude lying between 2 and 358 degrees and of single and constant radius R0.

Generally the turning radius R is dependent on a set of parameters such as: speed of the aircraft relative to the surrounding air mass (termed CAS for "Calibrated Air Speed"); the wind W (in the form of a vector); the altitude; the temperature outside the aircraft.

For example, the formula is known:

$$R = GS^2/g \cdot \tan(\varphi N) \quad (1)$$

With:
GS ground speed of the aircraft,
g gravitational constant
φN nominal roll angle predetermined as a function of the performance and of the type of aircraft.
We have the following vector equality:

$$GS = TAS + W \quad (2)$$

With TAS "True Air Speed", corresponding to the CAS speed corrected for the altitude of the aircraft and for the exterior temperature around the aircraft.

The FMS calculates, for a given transition, a single radius R0 on the basis of a single set of values of parameters. The fixed value of each parameter is defined as a function of the transition: average value, "worst case" (for example for the wind, see hereinbelow), value at the transition start point (example: altitude and temperature) etc. The single turning radius R0 is termed "conservative" in the sense that it is calculated in such a way that the trajectory is flyable whatever hazards are encountered along the trajectory.

A first example is illustrated in FIG. 2, for a calculation of transition T between a transition start point WPA and a transition end point WPB comprising a circular arc T0 between WPA and the point I and a straight part between I and WPB. Here the aircraft is slaved to the calculated trajectory which is frozen.

W0 represents the wind vector at the point WPA. The effect of the wind is obtained by projecting the wind vector onto the lateral trajectory. The worst case of impact of the wind on the aeroplane corresponds to the case for which the aircraft has the largest ground speed GS, i.e. a wind vector substantially collinear with the air speed of the aircraft. According to the prior art the wind effect taken into account by the FMS for the calculation of the turning radius R0 is the "worst case" for a wind W0 (that is to say considered at the start of the transition) extrapolated over the whole of T0. However, the value of the parameters can vary greatly along a transition, rendering the set of values of the parameters used for the calculations less representative. In the example the worst case of wind occurs only at the end of T0, on the portion T3. Thus R0 is calculated with the highest speed of the aircraft GSmax attained by the aircraft at the end of the transition.

The aircraft slaved to the conservative trajectory T, calculated by the FMS and frozen, therefore flies a large part of T0 at a smaller roll angle than the nominal roll and with a lower ground speed than GSmax. This low ground speed would have allowed the aircraft to fly at the nominal roll according to a smaller turning radius (see formula (1)). In fact over the whole start of T0, having regard to the direction of the wind W0 relative to the start of the trajectory, the aircraft would have been able to fly a "tighter" trajectory the commencement of which is illustrated by $T_{F1}$ or $T_{F2}$ in FIG. 2, corresponding to a turning radius which is smaller than R0. The conservative trajectory T0 is therefore non-optimized with respect to the flyable trajectory, and of larger area on the horizontal plane.

FIG. 3 illustrates a second example, for the case of a calculation of transition between a transition start point PA corresponding to the position of the aircraft A and a heading HD. According to the prior art, when the aircraft flies a transition towards a heading, the trajectory is not frozen as previously and it is the trajectory calculation which is refreshed automatically as the aircraft progresses. In this example it is also considered that the worst case of ground speed occurs only at the end of the transition.

The FMS begins by calculating a first conservative trajectory TCO of radius R0 ("worst case"). When the conditions (values of parameters, typically the ground speed) at the start of transition are more favourable than those that served for the conservative calculation, the aircraft, which here is not slaved to the trajectory calculated as in the previous example, will in reality fly a tighter trajectory $T_{F0}$. Indeed, the aircraft flying at nominal roll angle φN, the trajectory radius actually flown by the aircraft is determined by the value of the ground speed GS (see formula (1)). If the latter is lower than expected, the turning radius actually flown is smaller than R0.

Here the FMS recalculates and refreshes the trajectory automatically. The automatic refreshing is triggered either at regular intervals, or for example when the FMS detects that the real position of the aircraft differs by a certain disparity from the calculated position, such as illustrated at the point Refresh #1. The FMS then recalculates a first trajectory TC1, but still on the basis of the "worst case" which will occur only at the end of the transition, that is to say with a radius still equal to R0. But instead of flying TC1, the aircraft for the same reasons as previously flies a tighter trajectory $T_{F1}$. When the real position again differs substantially from the calculated position, at Refresh2# for example, the FMS recalculates TC2, still with the "worst case" (radius R0) but flies $T_{F2}$.

Finally at Refresh3# the FMS recalculates TC3 (still of radius R0) which this time will actually be flown by the aircraft on account of the fit between the value of the real ground speed and the value of the ground speed taken for the calculation of R0.

Thus during the flight by the aeroplane of the transition, new trajectories are recalculated at each refresh and displayed on the screens of the aeroplane cockpit. A consequence is that these calculated trajectories are not representative of the trajectory actually flown, and that the trajectory calculated and displayed by the FMS is not stable.

Moreover in this case, the predictions carried out at the start of transition on the basis of TC0 are erroneous, and the pilot will see the predictions evolve in tandem with the refreshes. This instability of the predictions affects the crew's ability to adhere to an RTA (Requested Time to Arrival).

This type of problem arises, for example, in the case of strong wind (and will be accentuated by a large transition angle), and on the other hand in the case of a large variation in speed along the transition (and it will be accentuated by a long transition).

Moreover, the technical problems described hereinabove and associated with the current mode of calculation of the transitions from a point (calculated point or real-time position of the aircraft) towards a point or a heading can in certain cases reduce the flight possibilities of departure and/or arrival procedures of airports situated in dangerous zones (such as mountainous zones) although aeroplane performance permits same.

An aim of the present invention is to alleviate the aforementioned drawbacks by proposing a method for calculating a trajectory intended to be flown by an aircraft exhibiting improved, flyable, reliable transitions that are tailored to the performance of the aircraft.

SUMMARY OF THE INVENTION

The subject of the present invention is a method of calculation, by a flight management system termed FMS, of a trajectory intended to be flown by an aircraft, a trajectory being determined on the basis of a flight plan comprising an ordered series of segments defined by an aeronautical standard, a segment corresponding to a directive for calculating an elementary trajectory, the trajectory being constructed gradually on the basis of the directives contained in each segment, a trajectory portion making it possible to link the elementary trajectories corresponding to two nonaligned consecutive segments being termed a transition, the method comprising the steps, calculated by the FMS, consisting in: for at least one transition of the trajectory arising from the flight plan:

1) determining an initial transition comprising at least one arc exhibiting a single initial turning radius, the said initial turning radius being calculated on the basis of an initial value of at least one parameter representative of the state of the aircraft, the said initial value guaranteeing the flyable character of the transition,
2) determining an initial trajectory incorporating the initial transition,
3) determining for each parameter a plurality of predicted values ($P_{AK1}$, $P_{AK2}$) of the said parameter in the course of the initial transition, on the basis of the calculation of the initial trajectory,
4) determining a plurality of ordered subdivisions of the arc of the initial transition according to a predetermined criterion,
5) determining, for each subdivision, an associated turning radius calculated on the basis of a value representative of each parameter for the said subdivision, extrapolated on the basis of values predicted in the said subdivision,
6) determining an improved transition on the basis of the ordered subdivisions and of the successive associated turning radii,
7) determining an improved trajectory (Traj-imp) incorporating the improved transition (Timp),
8) displaying the improved trajectory (Traj-imp) to a pilot of the aircraft.

Advantageously, step 5) comprises the sub-steps consisting in:
determining a variation function of the parameter as a function of an abscissa over the transition by an interpolation scheme, on the basis of the plurality of values predicted for each parameter,
determining the value representative of each parameter for each subdivision on the basis of the variation function of the parameter in the subdivision.

According to one embodiment the representative value ($P_A(i)$) of a parameter in a subdivision (Sub(i)) is equal to the average of the values of the variation function (PA(x)) in the subdivision.

Advantageously a parameter is the speed of the aircraft relative to the air.

Preferentially the turning radius is determined on the basis of a set of parameters comprising, in addition to the speed of the aircraft relative to the air, the wind and/or the altitude of the aircraft and/or the temperature outside the aircraft.

According to a variant the criterion consists in determining a number of subdivisions, each subdivision exhibiting an identical angular sector.

According to another variant the criterion consists in determining a number of subdivisions, and an angular sector for each subdivision as a function of the predicted values of the representative parameters along the transition.

According to one embodiment steps 3 to 7 are carried out in an iterative manner, an iteration being indexed j, the method furthermore comprising a step 2') consisting in loading a maximum number of iteration M, and in which onwards of the second iteration j=2, the value of the improved transition of the previous iteration j−1 is assigned to the initial transition of the current iteration j, and the improved trajectory of the previous iteration j−1 is assigned to the initial trajectory of the current iteration j, the method furthermore comprising the step consisting in:
5') determining at least one parameter of convergence between the current turning radii and the previous turning radii,
the method carrying out an additional iteration when j=1 or as a function of a comparison between the convergence parameter and a predetermined threshold, and as long as j<M.

According to one embodiment a convergence parameter is calculated by subdivision, the said convergence parameter being equal to the ratio between the current turning radius and the previous turning radius which are associated with the said subdivision, an additional iteration being carried out when at least one of the convergence parameters is greater than a first threshold.

According to another embodiment for each subdivision a ratio is calculated between the current turning radius and the previous turning radius which are associated with the said subdivision, the convergence parameter being equal to the average of the said ratios, an additional iteration being carried out when the convergence parameter is greater than a second threshold.

According to a variant the method is implemented although the aircraft is not yet flying the said transition, a point of commencement of the transition corresponding to a point calculated by the FMS.

According to another variant the method is implemented whilst the aircraft is in the process of flying a transition, a point of commencement of the initial transition corresponding to a real-time position of the aircraft.

According to one embodiment the said method is triggered by the pilot.

According to another embodiment the method is triggered automatically by the FMS, either at regular intervals or, when the aircraft is currently flying a transition, on the basis of the detection of a disparity of position of the aircraft between the previously calculated trajectory and the trajectory flown.

The invention also relates to a flight management system termed FMS comprising 1 configured to calculate a trajectory intended to be flown by an aircraft, a trajectory being determined on the basis of a flight plan comprising an ordered series of segments defined by an aeronautical standard, a segment corresponding to a directive for calculating an elementary trajectory, the trajectory being constructed gradually on the basis of the directives contained in each segment, a trajectory portion making it possible to link the elementary trajectories corresponding to two nonaligned consecutive segments being termed a transition, the FMS comprising:

a trajectory determination module configured to determine, for at least one transition of the trajectory arising from the flight plan, an initial transition comprising at least one arc exhibiting a single initial turning radius, the said initial turning radius being calculated on the basis of an initial value of at least one parameter representative of the state of the aircraft, the said initial value guaranteeing the flyable character of the transition and to determine an initial trajectory incorporating the initial transition, a predictions calculation module configured to determine, for each parameter, a plurality of predicted values of the said parameter in the course of the initial transition, on the basis of the calculation of the initial trajectory, the trajectory calculation module furthermore being configured to determine a plurality of ordered subdivisions of the arc of the initial transition according to a predetermined criterion, to determine, for each subdivision, an associated turning radius calculated on the basis of a value representative of each parameter for the said subdivision, extrapolated on the basis of values predicted in the said subdivision, and to determine an improved transition on the basis of the ordered subdivisions and of the successive associated turning radii and an improved trajectory incorporating the improved transition, a man machine interface configured to display the improved trajectory to a pilot of the aircraft.

The invention relates furthermore to a computer program product comprising code instructions making it possible to perform the steps of the method according to the invention.

BRIEF DESCRIPTION OF THE DRAWINGS

Other characteristics, aims and advantages of the present invention will become apparent on reading the detailed description which will follow and with regard to the appended drawings given by way of nonlimiting examples and in which.

DETAILED DESCRIPTION

The invention relates to a method 40 of calculation, by an FMS, of a trajectory intended to be flown by an aircraft. A trajectory is determined on the basis of a flight plan PV comprising an ordered series of segments, termed Legs, defined by an aeronautical standard, a segment corresponding to a directive for calculating an elementary trajectory. The trajectory is constructed gradually on the basis of the directives contained in each segment. The trajectory portions making it possible to link the elementary trajectories corresponding to two nonaligned consecutive segments are termed transitions T. A transition necessarily gives rise to at least one change of direction of the aircraft.

Figure 1:
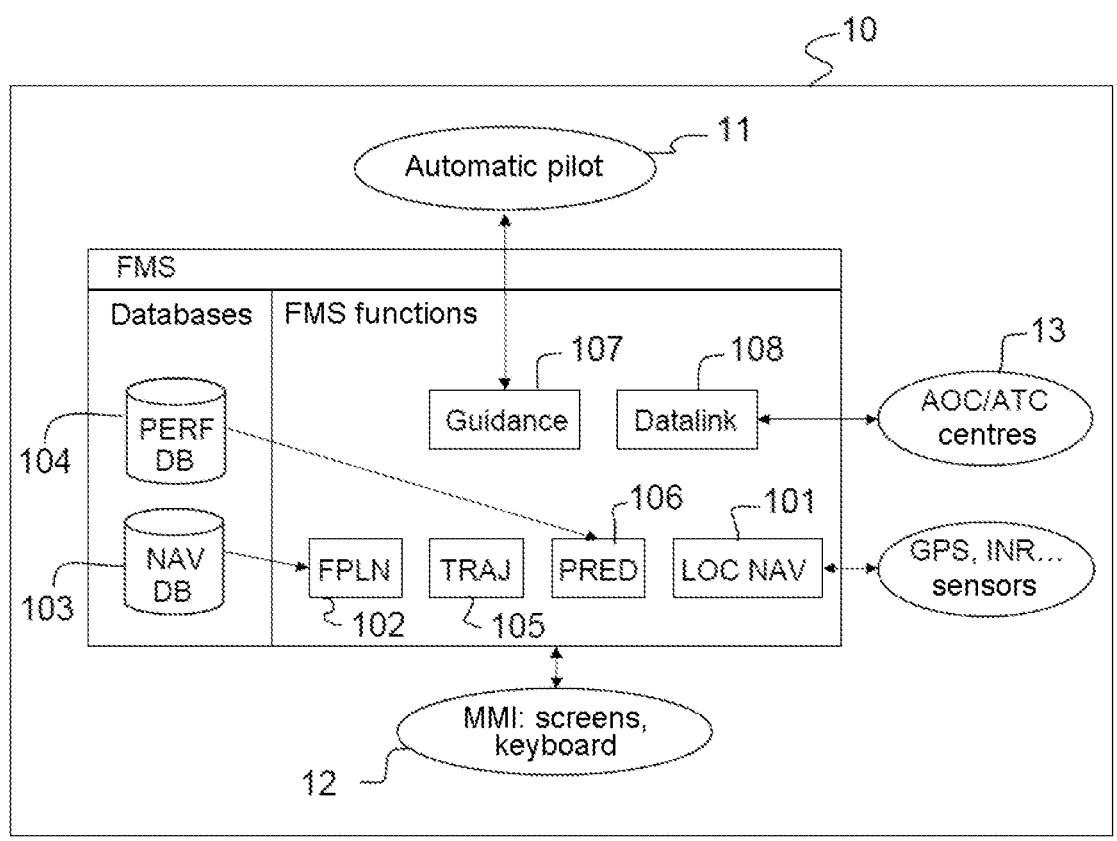
FIG. 1 already cited presents an overview illustrating the structure of an FMS known from the prior art.
Figure 2:
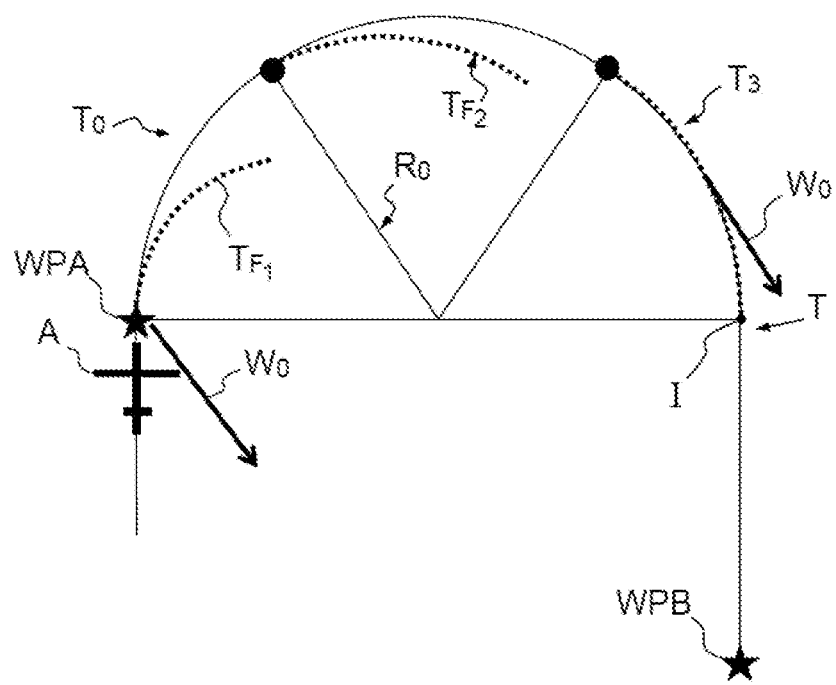
FIG. 2 already cited illustrates a first exemplary transition calculation according to the prior art between a transition start point and a transition end point.
Figure 3:
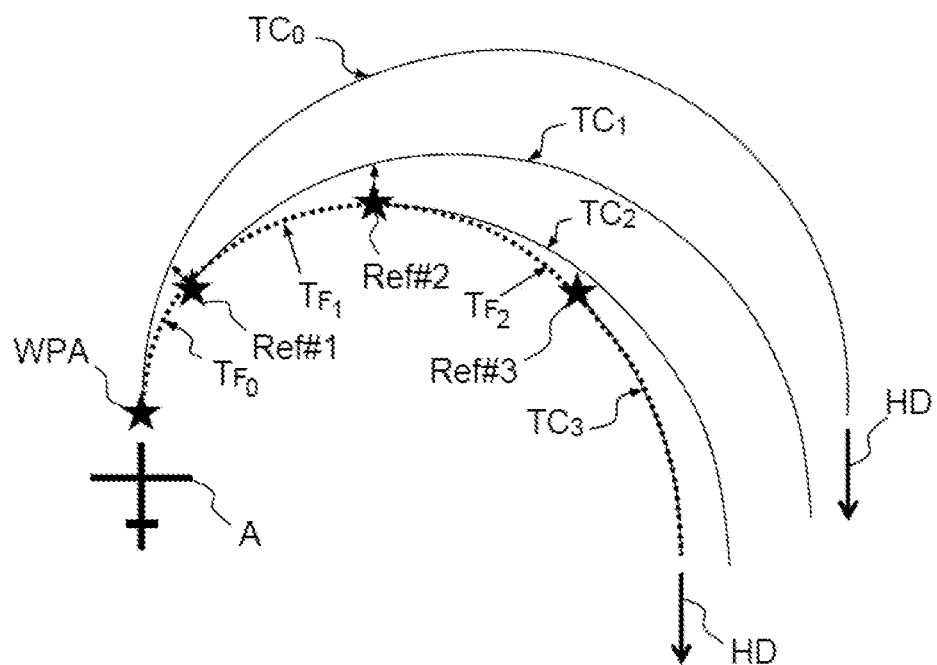
FIG. 3 already cited illustrates a second exemplary transition calculation according to the prior art between a transition start point and a heading.
Figure 4:
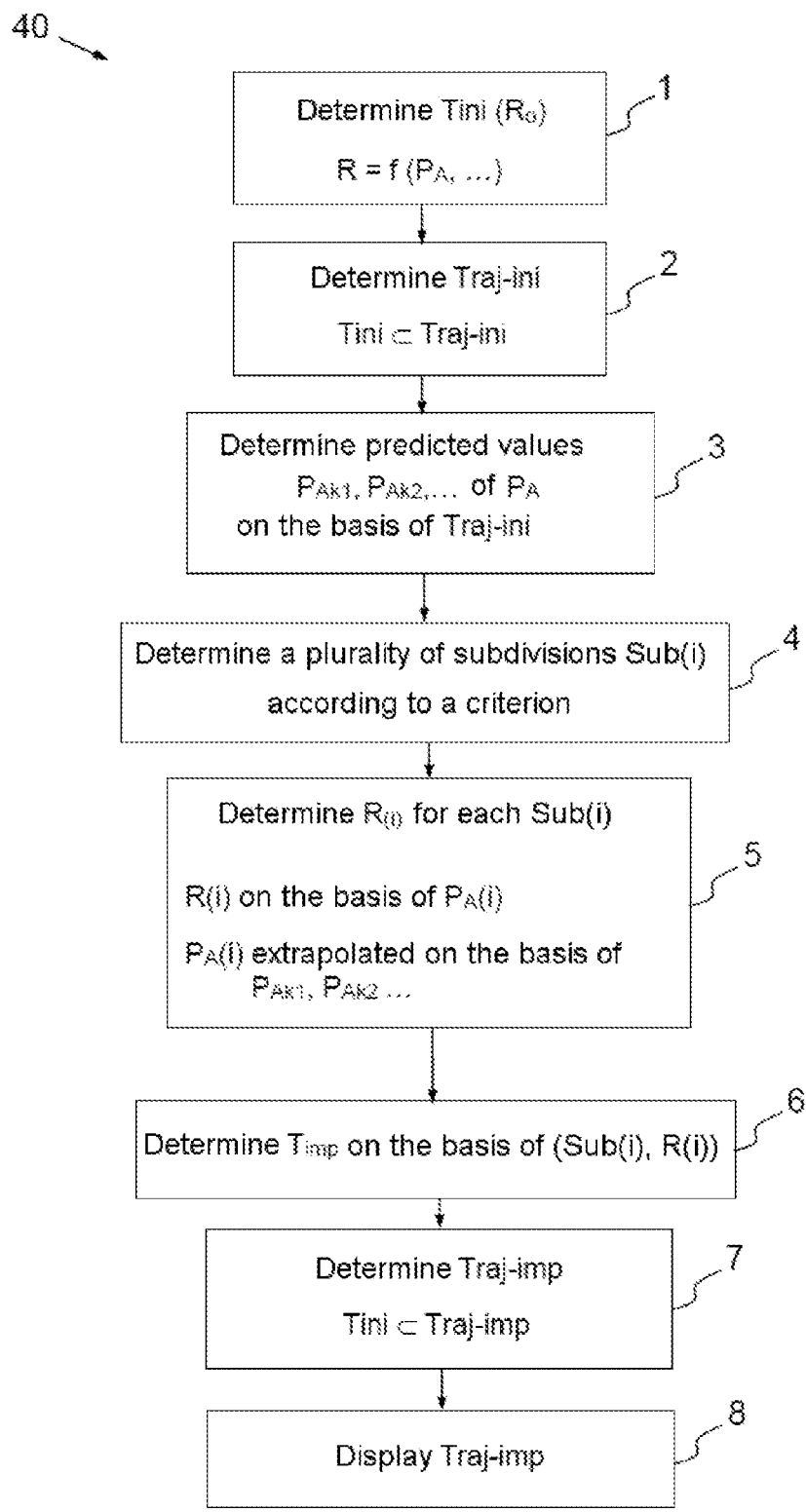
FIG. 4 illustrates the method according to the invention.

The method 40 is illustrated in FIG. 4 and consists in calculating an improved trajectory Traj-imp, by calculating at least one improved transition Timp, using not a single set of values of parameter over the whole of the transition, but several sets of values of the parameters, thereby making it possible to construct a "multi-radii" transition.

Accordingly in a first step 1) an initial transition Tini is determined comprising at least one arc of exhibiting a single initial turning radius R0. A curved trajectory portion is called an arc, an arc exhibiting a single radius is a circular arc. For example the transition can comprise a circular arc of radius R0 or two circular arcs, both of radius R0. The initial turning radius R0 is calculated on the basis of an initial value $P_{A0}$ of at least one parameter $P_A$ representative of the state of the aircraft. The value of this parameter evolves in the course of the transition. This initial value is determined so as to guarantee the flyable character of the transition. For example it corresponds to the situation of the aircraft at the start of a transition but by taking account of a "worst case". This value is for example the first prediction (carried out by the module PRED) available at the start of the transition or by extrapolating predictions on the basis of simple assumptions. This calculation corresponds to the transition calculation described in the prior art, R0 corresponding to a "conservative" turning radius. The flyable character is indeed ensured by considering for example "the worst case" of wind such as described in the prior art.

According to one embodiment, the parameter used is the air speed of the aircraft $P_A$=CAS.

According to a preferred mode, the following representative parameters are considered:

$P_A$=CAS, $P_B$=Temp, temperature outside the aircraft $P_C$=Alt, altitude of the aircraft Alt, which make it possible to calculate TAS (see prior art), $P_D$=W, the wind, which makes it possible, in combination with TAS, to calculate the ground speed GS.

Let $CAS_0$, $Alt_0$, $Temp_0$, and $W_0$ be the initial values of the representative parameters. On the basis of these values we calculate $TAS_0$ and then $GS_0$. On the basis of $GS_0$ and of the nominal roll angle φN of the aircraft, we calculate the turning radius R0 with formulae (1) and (2):

$$R0 = GS_0^2 / g \cdot \tan(\varphi N) \tag{1}$$

Next in a step 2) an initial trajectory Traj-ini incorporating the initial transition Tini is determined, this also corresponding to the calculation of the prior art.

In a step 3), a plurality of predicted values $P_{Aj1}, P_{Ak2} \ldots P_{Bk1}, P_{Bk2} \ldots P_{Ck1}, P_{Ck2} \ldots P_{Dk1}, P_{Dk2} \ldots$ of the parameters $P_A$, $P_B$, $P_C$ and $P_D$ is determined along the initial transition Tini on the basis of the calculation of the initial trajectory and for each parameter. This calculation of predictions is carried out by the module PRED of the FMS. The module TRAJ calculates a lateral trajectory, and the module PRED a vertical trajectory as a function typically of a curvilinear abscissa x, which labels the position of the aeroplane on the trajectory, which position is expressed by a distance relative to the start of the trajectory (or a time elapsed from the commencement, taking account of the speed of the aircraft). The predictions of the parameters $P_A$, $P_B$, $P_C$ and $P_D$, also carried out by the module PRED, are the values taken by these parameters at certain curvilinear abscissae of the trajectory. The triggering of a prediction calculation obeys a complex logic, and globally predictions are calculated at each significant point/event along the trajectory. An "aeroplane state" is thus extracted at the various key sites of the transition. As described further on, these predictions will make it possible to evaluate the variation of each parameter $P_A$, $P_B$, $P_C$ . . . representative of the aeroplane state used.

In a step 4) a plurality of ordered subdivisions Sub(i) of the arc, or of at least one arc when there are several of them in the transition, of the initial transition Tini is determined according to a predetermined criterion. The subdivisions are indexed by an index i varying from 1 to N, N being the total number of subdivisions. Several variants of criteria are described further on.

Figure 5A:
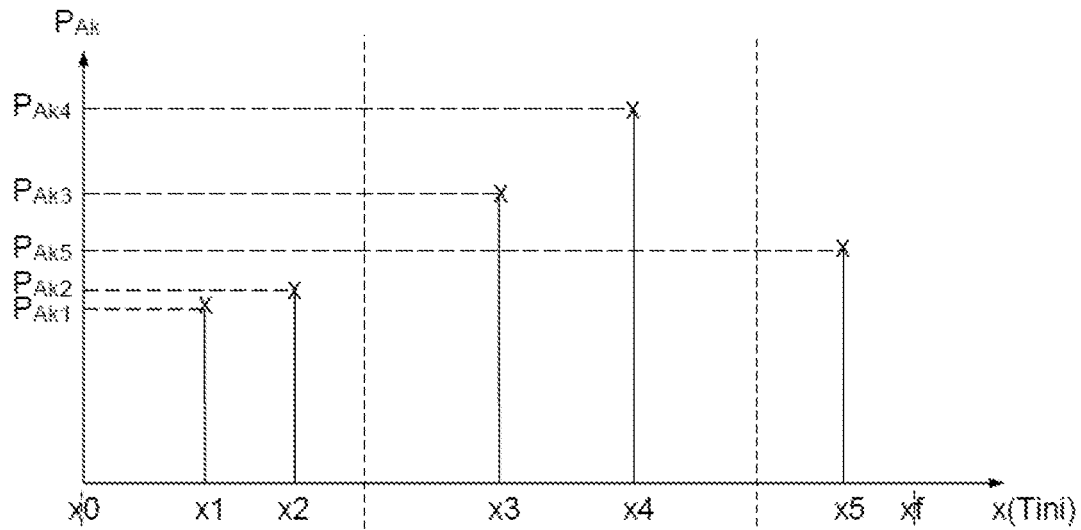
FIG. 5a illustrates various predicted values of the parameter $P_A$ along the transition Tini.

In step 5), for each subdivision Sub(i), an associated turning radius R(i) is determined, calculated on the basis of a representative value $P_A(i)$, $P_B(i)$, $P_C(i)$, $P_D(i)$ of each parameter for the subdivision i, extrapolated on the basis of the predicted values, determined in step 3), taken by the parameters $P_A$, $P_B$, $P_C$ and $P_D$ in the subdivision. FIG. 5 illustrates an example of the determination of representative values for a parameter $P_A$. FIG. 5a illustrates various predicted values $P_{Ak}$ of the parameter $P_A$, $P_{Ak1}$, $P_{Ak2}$, $P_{Ak3}$ and $P_{Ak4}$, $P_{Ak5}$ along the transition Tini, for abscissae x1, x2, x3, x4, x5 situated between the curvilinear abscissa x0 corresponding to the start of the transition and the curvilinear abscissa x1 corresponding to the end of the transition.

The transition Tini has been subdivided into 3 subdivisions represented as a function of the curvilinear abscissa. It will be noted that these subdivisions can be calculated in the form of an angle (see further on), which is thereafter labelled in terms of curvilinear abscissa.

Figure 5B:
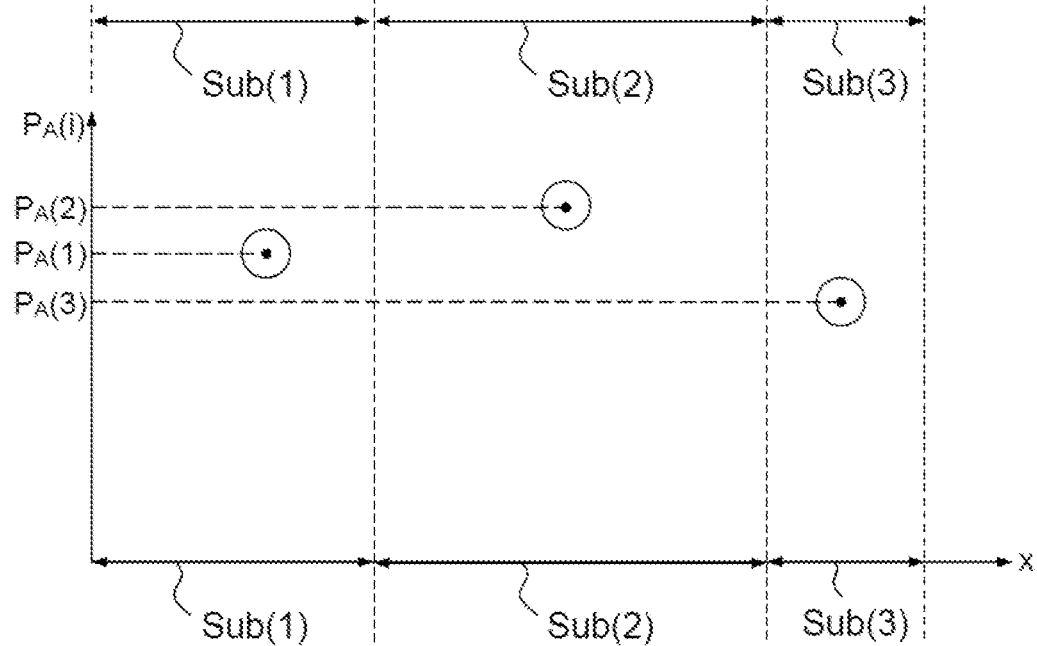
FIG. 5b illustrates the values representative of the parameter $P_A$ for each subdivision, obtained by an extrapolation scheme based on the predicted values.

FIG. 5b illustrates the representative values of $P_A$ for each subdivision Sub(1), Sub(2) and Sub(3), respectively $P_{A1}$, $P_{A2}$, $P_{A3}$, obtained by an extrapolation scheme based on $P_{Ak1}$, $P_{Ak2}$, $P_{Ak3}$ and $P_{Ak4}$. Several examples of interpolation scheme are given further on.

Based on these representative values, a turning radius R(i) is calculated for each subdivision i. The representative values are closer to the real situation of the aircraft than those taken by the prior art, since they correspond to values extrapolated on the basis of the situation in the subdivision. The turning radius R(i) is therefore in most cases less than R0 determined previously but it may also be higher in the case of a strong acceleration, evaluated poorly by the FMS, at the waypoint. It is close or equal to R0 for the subdivision whose representative values are the closest to the single values used for the initial calculation.

For the preferred mode in which the aforementioned 4 representative parameters are speed, altitude, temperature and winds, the turning radius R(i) for each subdivision i is determined by formulae (1) and (2) on the basis of the representative values CAS(i), Alt(i), Temp(i) and W(i) for the subdivision i.

Next, in a step 6), an improved transition Timp is determined on the basis of the ordered subdivisions Sub(i) and of the successive associated turning radii R(i). The arc of the improved transition, that is to say its curved part, is composed of several circular arcs of radius R(i) which follow one another in a continuous and ordered manner for i=1 to N, N being the number of subdivisions. Several examples of determining improved transition are given in FIGS. 6 to 8.

Figure 6:
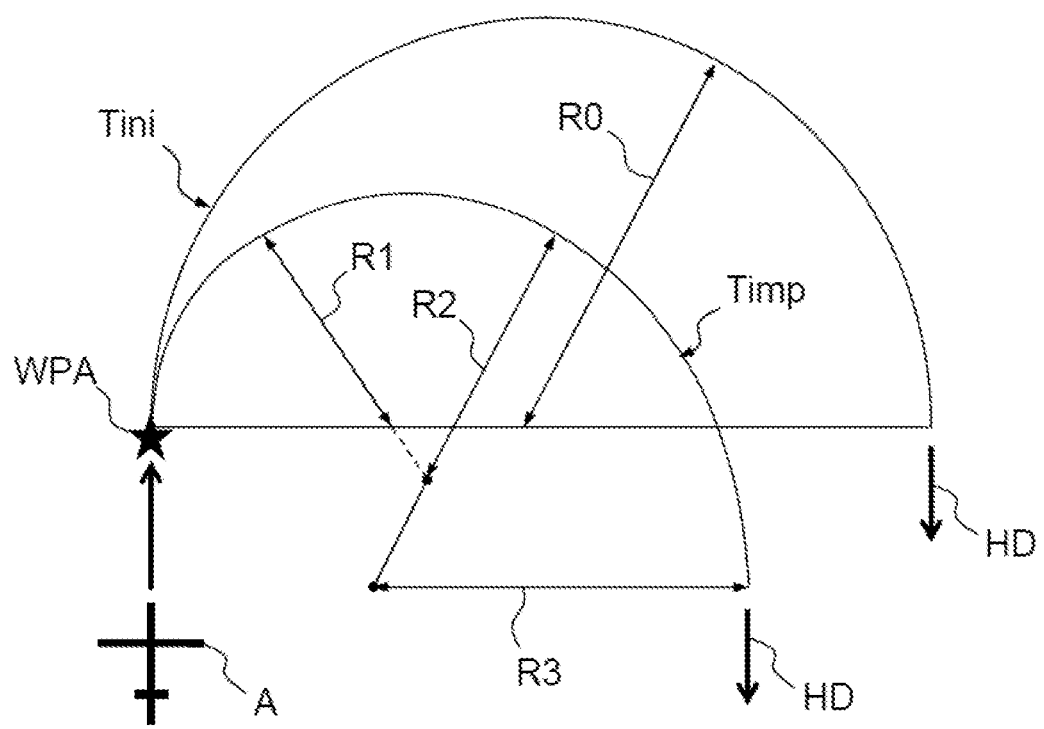
FIG. 6 illustrates a construction of the improved transition for an initial transition a point WPA and a heading HD.

FIG. 6 illustrates such a construction for an initial transition Tini between a point WPA and a heading HD. The initial transition Tini is a conservative, or "protected" as explained above, circular arc of radius R0 and of angular sector 180°. It has been subdivided into 3 portions, each of angular sector equal to 60°. The wind conditions being more favourable at the start of the transition, the start of the transition Timp is performed with a smaller turning radius than the protected radius R0, this being manifested by the values of the representative parameters calculated for each subdivision. The transition Timp takes the form of an arc consisting of 3 circular arcs of increasing respective radii R1, R2 and R3, with R3 equal to or very close to R0, since it is at the end of the transition that the effect of the wind is the most unfavourable.

Figure 7:
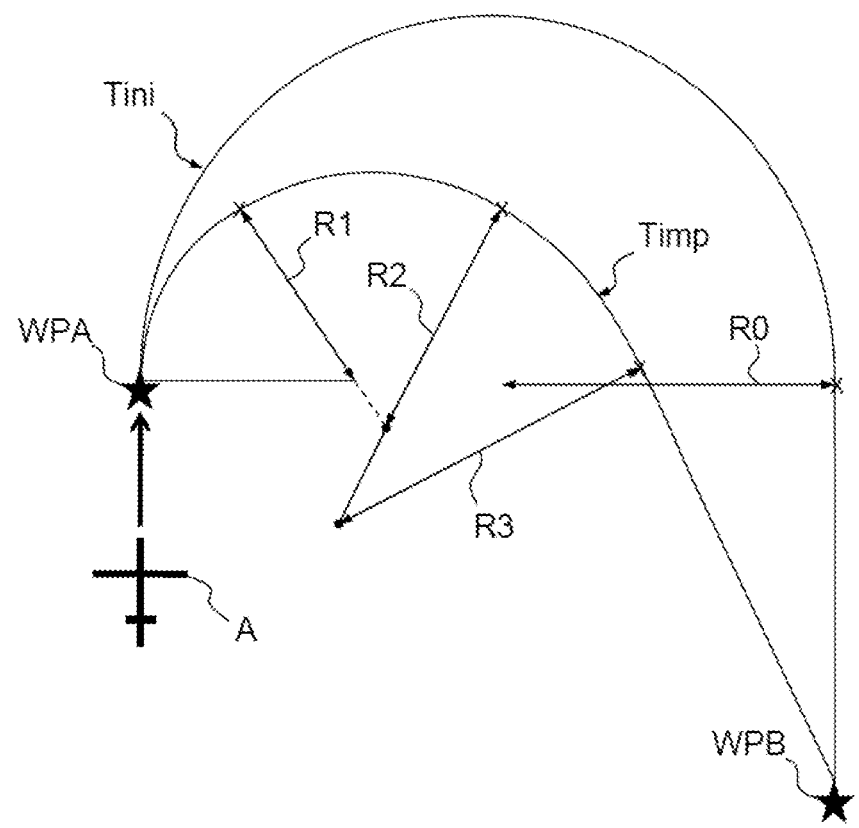
FIG. 7 illustrates the construction of the improved transition in the case of an initial transition between a point WPA and a point WPB.

FIG. 7 illustrates the construction of Timp in the case of an initial transition Tini between a point WPA and a point WPB, comprising a circular arc of radius R0 and of angular sector of 180°, and a straight line portion. The cutting of the arc of Tini is carried out according to 3 subdivisions corresponding to angular sectors of 60°.

The improved transition Timp comprises an arc, consisting of 3 circular arcs of increasing radii R1, R2 and R3, and a straight line portion.

Figure 8:
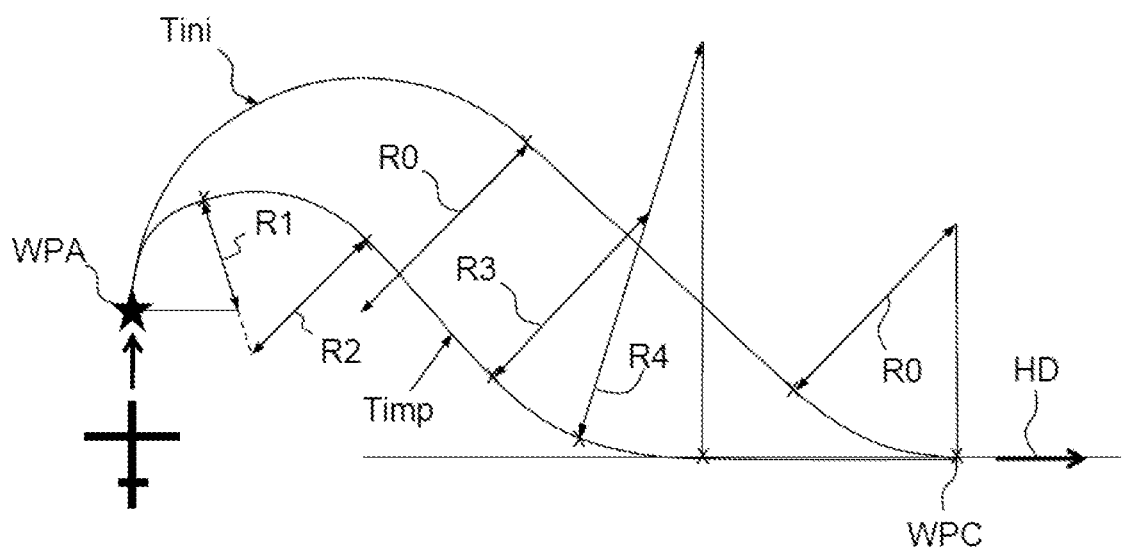
FIG. 8 illustrates the construction of the improved transition in the case of an initial transition between a point WPA and an arrival point characterized by a point WPC and a heading HD.

FIG. 8 illustrates the construction of Timp in the case of an initial transition Tini between a point WPA and an arrival point characterized by a point WPC and a heading HD. Tini exhibits a single turning radius R0, but the aircraft performs two turns of radius R0 during the transition. Tini consists of a first circular arc of radius R0 (turn to the right) of angular sector equal to 135°, of a straight line portion and of a second circular arc of radius R0 (turn to the left) of angular sector equal to 45°.

In this example, the two circular arcs, which each correspond to a turn of the aircraft, are cut according to 2 subdivisions each, of 2 values of angular cutting sector for the 2 circular arcs of half the initial value of the angular sector, i.e. 67.5° for the first arc and 22.5° for the second.

The improved transition Timp constructed comprises a first arc consisting of two circular arcs respectively of radii R1, R2 (in replacement for the first circular arc of radius R0), of a straight line portion and of a second arc consisting of two circular arcs, respectively of radii R3 and R4 (in replacement for the second circular arc of radius R0). Preferentially as in this example the cutting into subdivision is performed for all the arcs of the initial transition, when the latter has several of them.

The improved transitions Timp are in all cases more representative than the initial transition Tini.

An improved trajectory Traj-imp incorporating the improved transition Timp is determined in step 7), and the improved trajectory Traj-imp is displayed to a pilot of the aircraft in step 8). The trajectory is constructed gradually, so as to be continuous and differentiable.

Preferentially the method 40 according to the invention is implemented for all the transitions of the flight plan.

The method is based on a "multi-radii" concept based on the subdivision of the transition. It uses specific parameter values for each subdivision that are more representative of the real environment of the aircraft, instead of a single value for the whole transition. For one and the same parameter intervening in the calculations (example: wind, speed, etc.), several values are therefore used (one per transition subdivision).

The method 40 according to the invention exhibits numerous advantages:

For the case of a transition towards a point, the method 40 calculates a trajectory that is closer to those achievable having regard to the performance of the aeroplane, reducing, in the majority of cases, the turning radii of the transition.

For the case of a transition towards a heading, the method 40 makes it possible to display on transition entry a trajectory which will be closer to that flown by the aeroplane, therefore to have a reference trajectory which is more stable on the lateral and vertical plane. This stability is also perceived by the pilot via the display, the trajectory flown is closer to the trajectory displayed at each refresh. The reference trajectory is all the more stable, and more reliable, the higher the number of radii (in particular in the case of strong wind).

Thus, the higher the number of turning radii used for the calculation of the transition Timp, the more representative is the calculated trajectory of the trajectory that is flyable (transition towards a point with or without imposed heading), or flown by the aeroplane (transition towards a heading).

Moreover, the method according to the invention exhibits a major advantage in the case, for example, of an aeroplane during departure or arrival procedure at an airport situated in a mountainous zone, since the area required for the transition (real or predicted as the case may be) is reduced relative to the area of the initial transition. It is therefore possible to envisage, on account of the reduction in the turning radii of the transition, a departure or arrival procedure flight which is impossible to envisage with the mode of calculation according to the prior art.

The method according to the invention also affords better stability as regards the ability to adhere to an RTA together with better precision in the calculation of the fuel at the destination and consequently the possibility of reducing the margins taken.

The way of carrying out the cutting of the arc of the transition into subdivisions can be performed in various ways. Indeed the number of sub-divisions directly influences the precision of the calculated improved transition. The calculation power and the time allocated to the display of a trajectory for an FMS being limited, a compromise must be found between integrity and availability. The function for determining the number of sub-divisions may be dependent on:

Global quality of the calculated predictions
Evolution of the speed
Evolution of the altitude
Evolution of the wind In the case of a linear acceleration when holding level with no wind, one embodiment is a cutting into angular sectors of constant size.

According to one embodiment the criterion consists in determining a number of subdivisions N, each subdivision corresponding to an angular sector of angle equal $\alpha$, the angle $\alpha$ corresponding to the angular sector of the initial transition $\theta_0$ divided by the number of subdivisions N.

The fact of using a small number of values for each parameter in the subdivision is called "fast" predictions, and the fact of using a more significant number of values for each parameter is called "refined" predictions.

Thus the angle $\alpha$ of a subdivision is significant (N small) in the case of "fast" predictions (few available values of each representative parameter) and is smaller (N large) for "refined" predictions.

In another case for example of deceleration with change of altitude, the cutting can be with non-constant angular sectors but for example exhibiting a linear function along the transition (fine cutting at the start when the variation of the deceleration is significant and then coarser cutting at the end when the aeroplane has a stabilized deceleration, that is to say that the variation of acceleration is zero).

According to another embodiment the criterion consists in determining a number of subdivisions N and the value of the angular sector $\alpha(i)$ of each subdivision Sub(i) as a function of the predicted values, along the transition, of the representative parameters. For example as a function of the predicted values of the speed relative to the air of the aircraft, and/or of the wind and/or of the temperature and/or of the altitude.

Another exemplary scheme for determining the size of a sub-division is as follows:

Let us consider the following 3 assertions: Variable speed along the transition; Variable altitude along the transition; presence of wind along the transition.

As a function of the quality of the calculated predictions and of the number of true assertions, a table for determining the angular sector $\alpha(i)$ or angular aperture of a sub-division Sub(i) could be:

| Table for determining the angular sector of a subdivision | | | |
|---|---|---|---|
| | $\alpha(i)$ for all i 1 assertion true | $\alpha(i)$ for all i 2 assertions true | $\alpha(i)$ for all i 3 assertions true |
| "Fast" predictions | 90° | 60° | 30° |
| "Refined" predictions | 60° | 30° | 15° |

Figure 9:
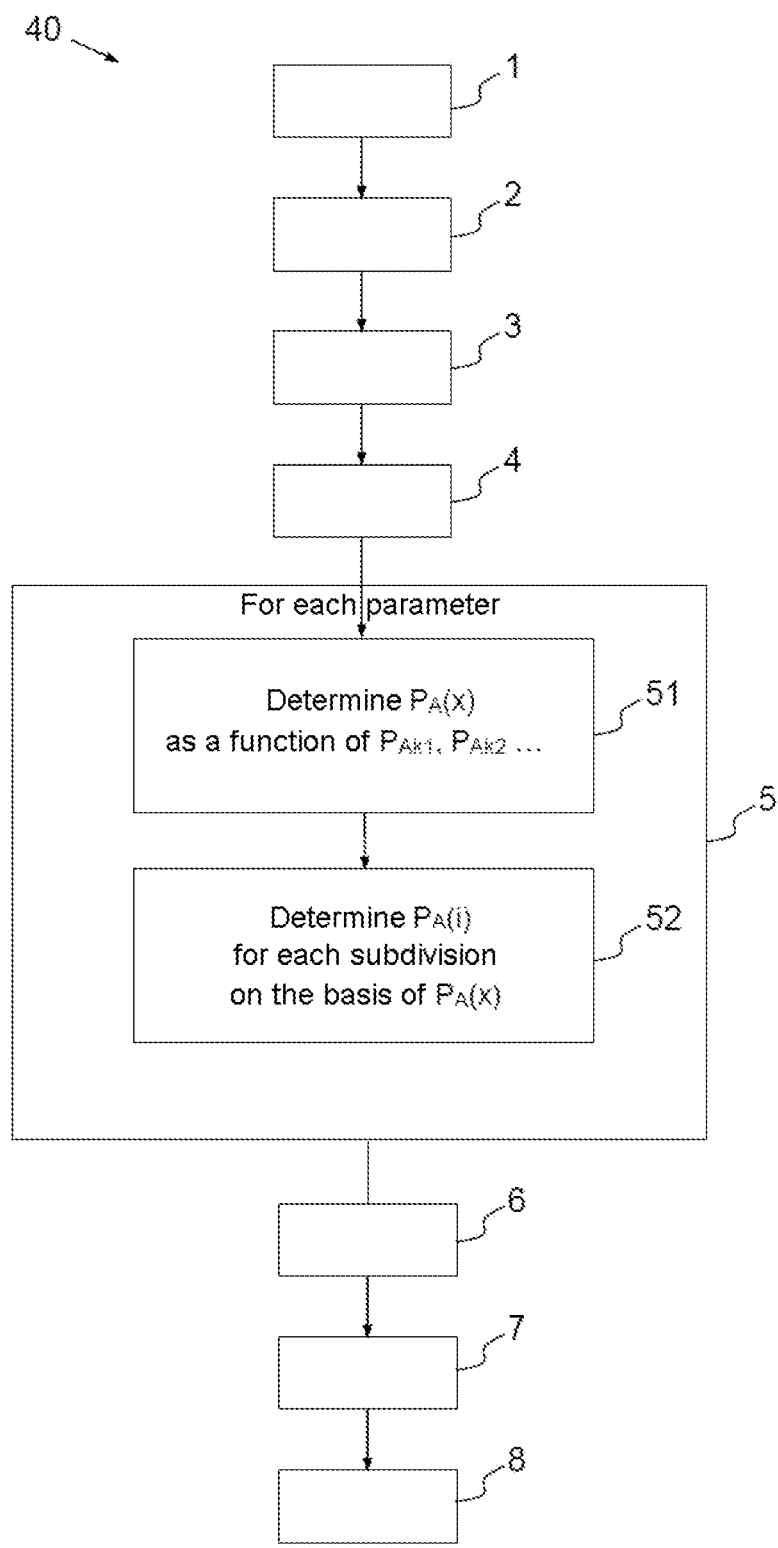
FIG. 9 shows diagrammatically a variant of the method according to the invention.

According to a preferred variant illustrated in FIG. 9, step 5) of the method 40 comprises a sub-step 51 in which a variation function of the parameter PA(x) is determined as a function of an abscissa x over the transition by an interpolation scheme, on the basis of the plurality of values predicted for each parameter, and a sub-step 52 in which the representative value $P_A(i)$ of each parameter $P_A$ for each subdivision Sub(i) is determined on the basis of the variation function of the parameter PA(x) in the subdivision.

Typically x is the curvilinear abscissa of the transition.

Figure 10:
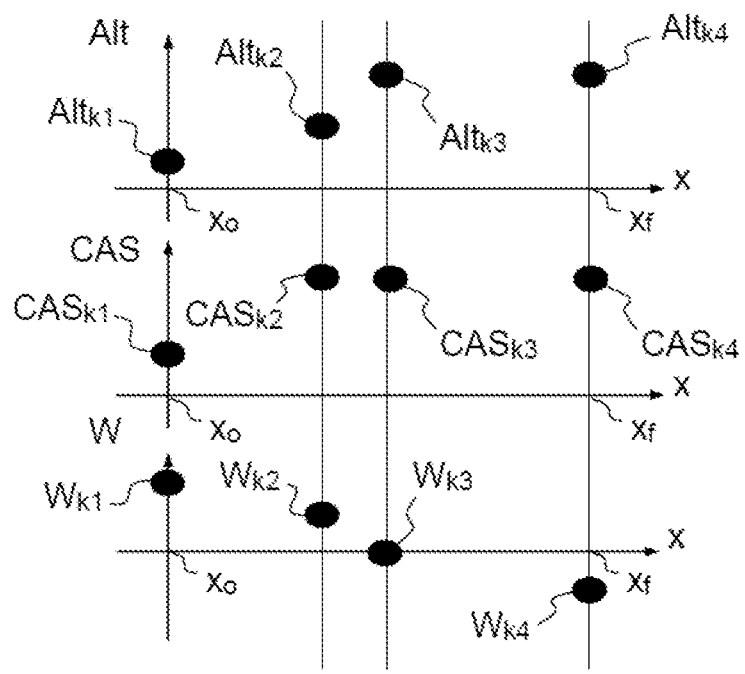
FIG. 10 illustrates predicted values of the parameters Altitude, Ground speed and Wind speed along the transition.
Figure 11:
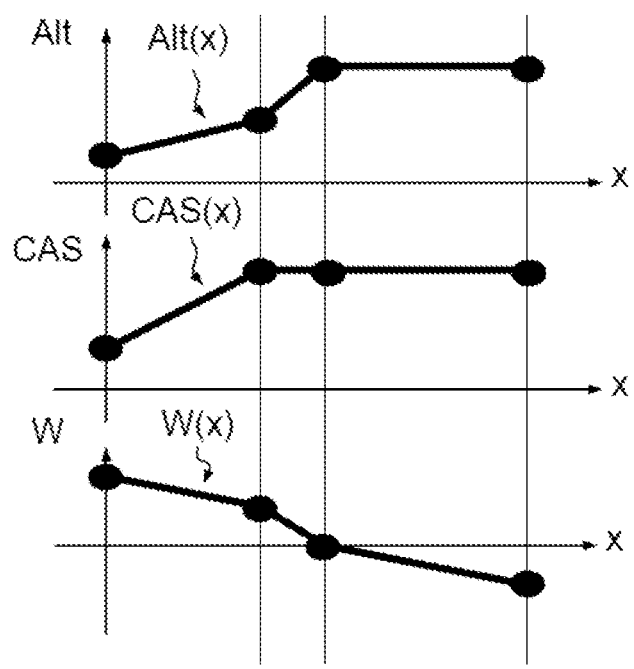
FIG. 11 illustrates an exemplary variation function of each parameter, i.e. Alt(x), CAS(x) and W(x), obtained by piecewise linear interpolation.
Figure 12:
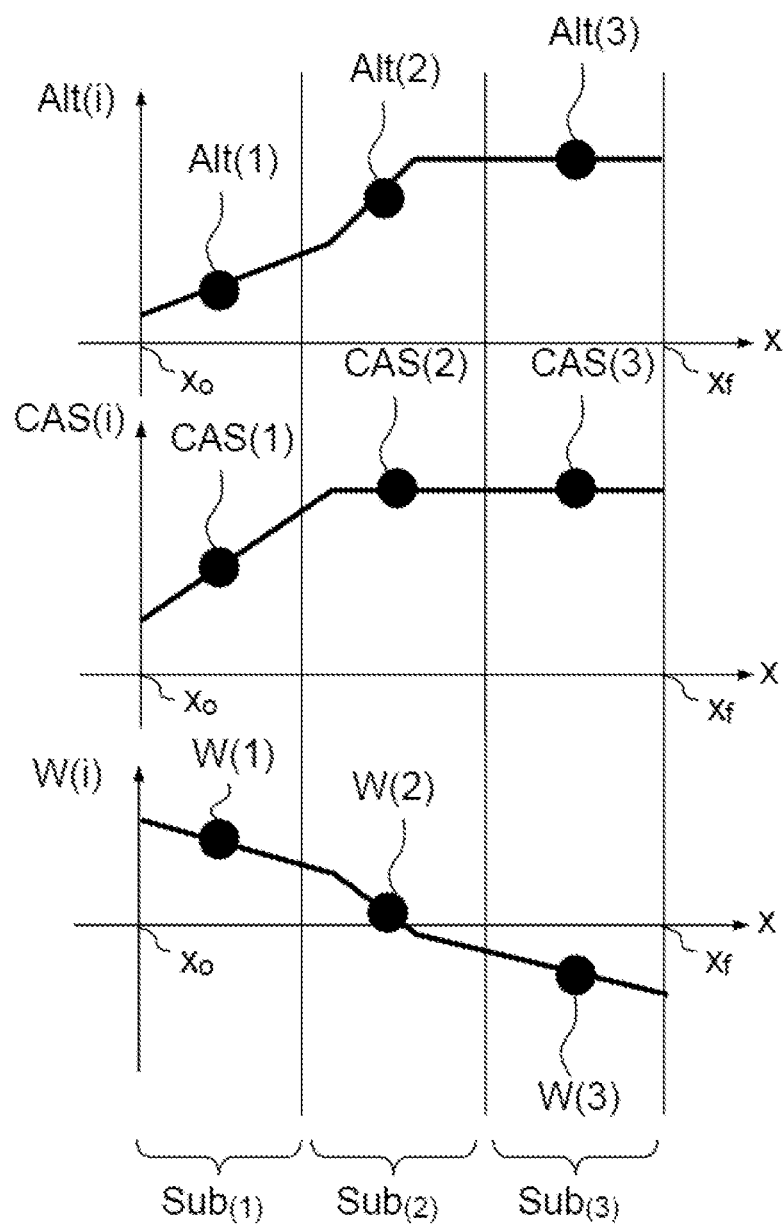
FIG. 12 illustrates an embodiment of the invention, in which the representative value $P_A(i)$ of a parameter in a subdivision Sub(i) is equal to the average of the values of the variation function $P_A(x)$ in the subdivision.

An example is illustrated in FIGS. 10, 11 and 12 when three representative parameters are used, namely the altitude Alt, the air speed CAS and the wind W.

FIG. 10 illustrates the predicted values of these parameters $Alt_{k1}, \ldots CAS_{k1} \ldots, W_{k1} \ldots$ along the transition (between x0 and xf). The various values of these parameters along the transition represents an "aeroplane state" at the various key sites of the transition. These states will make it possible to evaluate the variations of the various representative parameters and dimensioning.

FIG. 11 illustrates the variation function of each parameter i.e. Alt(x), CAS(x) and W(x) which is here an affine function obtained by piecewise linear interpolation. Other interpolation schemes can of course be used, such as polynomial approximation or logarithmic regression.

According to one embodiment, the representative value $P_A(i)$ of a parameter in a subdivision Sub(i) is equal to the average of the values of the variation function $P_A(x)$ in the subdivision.

This mode is illustrated in FIG. 12, in which the representative value adopted of each parameter Alt(1) ... CAS(1) ... W(1) ... for each subdivision is equal to the average of the variation function of the parameter Alt(x), CAS(x), W(x) over the subdivision. On the basis of this mean triplet, a value of mean turning radius is calculated R(i) for each subdivision Sub(i) and the "multi-radius" improved transition is calculated in a successive piecewise fashion.

Figure 13:
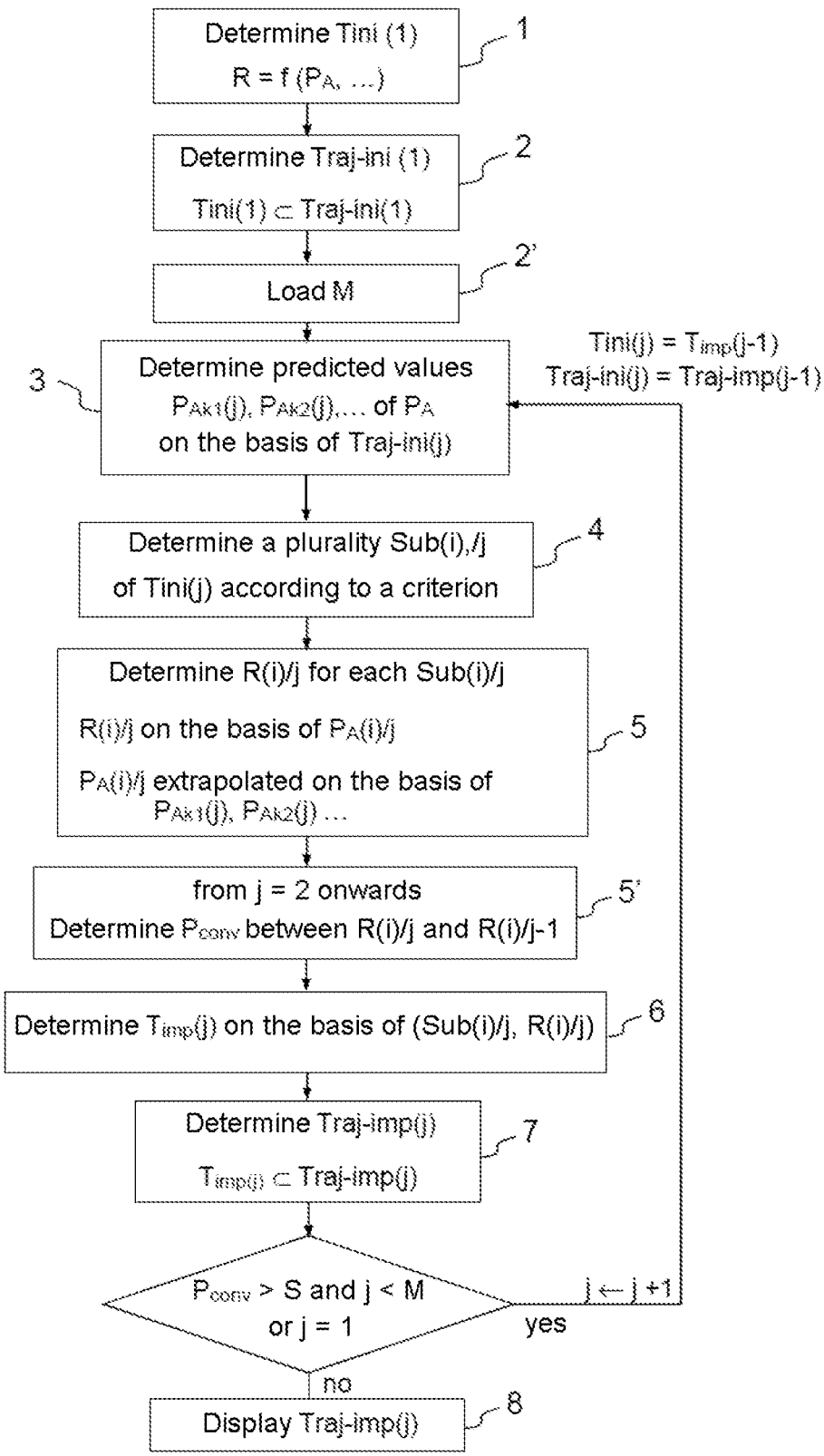
FIG. 13 illustrates a variant of the method according to the invention, in which the method is carried out in an iterative manner.

According to a variant illustrated in FIG. 13, the method 40 is carried out in an iterative manner such as described hereinbelow, so as to check the consistency of the calculated turning radii and thus the flyable character of the calculated improved transition.

Accordingly, steps 3 to 7 are carried out in an iterative manner, an iteration being indexed j, the index j=1 corresponding to the first pass as described in FIG. 4. In an extra step 2') a maximum number of iteration M is loaded, so as not to remain blocked in non-convergence situations and to limit the CPU load of the FMS.

Onwards of the second iteration j=2, the value of the improved transition of the previous iteration j−1 is assigned to the initial transition of the current iteration j Tini(j), and the improved trajectory of the previous iteration j−1 Traj-imp(j−1) is assigned to the initial trajectory of the current iteration j Traj-ini(j). With these new inputs, a cutting into subdivisions of the multi-radius trajectory Traj-imp(j−1) is carried out, and current turning radii are calculated whose consistency with the turning radii calculated at the previous iteration will be checked.

This amounts to checking that the newly calculated predictions are indeed consistent with the turning radius determined.

Accordingly in a step 5') at least one parameter Pconv of convergence between the current turning radii R(i)/j (iteration j) and the previous turning radii R(i)/j−1 (iteration j−1) is determined.

The method carries out an additional iteration when j=1 (so as to perform a new calculation of turning radii at least once) or as a function of a comparison between the convergence parameter Pconv and a predetermined threshold, and as long as j<M.

Indeed if after the maximum number of iterations M the threshold is not attained, the method stops and the last calculated trajectory is displayed. Optionally, the pilot is informed of the non-convergence, and he is prompted to choose the best improved trajectory calculated. It is also possible to define an adjustment of the last calculated turning radii which takes account of the radii calculated at the previous iterations.

When convergence is obtained, the last trajectory Traj-imp (j) is displayed to the pilot, including the transition Timp(j).

According to a variant, a plurality of convergence parameters is calculated, one convergence parameter Pconv(i) per subdivision. According to one embodiment, each convergence parameter is equal to the ratio between the current turning radius R(i)/j and the previous turning radius R(i)/j−1 which are associated with the said subdivision:

$$Pconv(i)=R(i)\text{iteration } j/R(i)\text{iteration } j-1.$$

The convergence parameter is likened here to a dispersion between the successively calculated radii.

Also for example an additional iteration is carried out when at least one convergence parameter Pconv(i) is greater than a first threshold S1, for example 20% for the previous case of the dispersion.

According to another variant, a ratio between the current turning radius and the previous turning radius which are associated with the subdivision is calculated for each subdivision, and the convergence parameter is equal to the average of the ratios. An additional iteration is carried out when the convergence parameter is greater than a second threshold S2, for example 15% for the example of the dispersion, the second threshold S2 being more severe than the first threshold S1.

The two variants may of course be combined together, convergence being obtained when the double condition is satisfied.

The method according to the invention can be implemented in various operational contexts.

According to a first situation, the method is implemented although the aircraft is not yet flying the transition Tini, the point of commencement of the transition Tini then corresponds to a point calculated by the FMS.

According to a second situation the method is implemented whilst the aircraft is currently flying a transition, the point of commencement of the initial transition then corresponds to a real-time position of the aircraft.

According to a variant the method according to the invention is triggered by the pilot.

According to another variant, the method 40 is triggered automatically by the FMS, either at regular intervals or, when the aircraft is currently flying a transition, on the basis of the detection of a disparity of position of the aircraft between the previously calculated trajectory and the trajectory actually flown.

According to another aspect the invention relates to a flight management system termed FMS configured to calculate a trajectory intended to be flown by an aircraft, the FMS comprising a module TRAJ, a module PRED and a man machine interface 12 such as are described according to the prior art, these modules being configured in a specific manner to implement the method according to the invention. Thus the trajectory determination module TRAJ is configured to determine, for at least one transition T of the trajectory arising from the flight plan PV, an initial transition Tini comprising at least one arc exhibiting a single initial turning radius R0, the initial turning radius being calculated on the basis of an initial value $P_{A0}$ of at least one parameter $P_A$ representative of the state of the aircraft, the initial value guaranteeing the flyable character of the transition and to determine an initial trajectory Traj-ini incorporating the initial transition Tini.

The predictions calculation module PRED is configured to determine, for each parameter, a plurality of predicted values $P_{Ak1}, P_{AK2} \ldots$ of the parameter in the course of the initial transition, on the basis of the calculation of the initial trajectory.

The trajectory calculation module TRAJ is furthermore configured:

to determine a plurality of ordered subdivisions Sub(i) of the arc of the initial transition Tini according to a predetermined criterion, to determine, for each subdivision Sub(i), an associated turning radius R(i) calculated on the basis of a representative value $P_A(i)$ of each parameter for the said subdivision, extrapolated on the basis of values predicted in the said subdivision, and to determine an improved transition Timp on the basis of the ordered subdivisions Sub(i) and of the successive associated turning radii (Ri) and an improved trajectory Traj-imp incorporating the improved transition Timp.

The man machine interface 12 is configured to display the improved trajectory (Traj-imp) to a pilot of the aircraft.

According to another aspect, the invention relates to a computer program product comprising code instructions making it possible to perform the steps of the method according to the invention.

The method can be implemented on the basis of hardware elements and/or software elements. The method can be available in the guise of computer program product on a computer readable medium.

The method can be implemented on an FMS system able to use one or more dedicated electronic circuits or a general-purpose circuit.

The technique of the method according to the invention can be achieved on a reprogrammable calculating machine (a processor or a microcontroller for example) executing a program comprising a sequence of instructions, or on a dedicated calculating machine (for example a set of logic gates such as an FPGA or an ASIC, or any other hardware module).

The various modules of the FMS system according to the invention can be implemented on one and the same processor or on one and the same circuit, or distributed over several processors or several circuits. The modules of the system according to the invention consist of calculation means including a processor.

The reference to a computer program which, when it is executed, performs any one of the previously described functions, is not limited to an application program executing on a single host computer. On the contrary, the terms computer program and software are used here in a general sense to refer to any type of computing code (for example, application software, micro software, microcode, or any other form of computer instruction) which can be used to program one or more processors to implement aspects of the techniques described here.

The invention claimed is:

1. A method for calcuiating, by a light management system, a trajectory intended to be flown by an aircraft, the intended trajectory being determined based on a flight plan comprising an ordered series of legs defined by an aeronautical standard, a leg corresponding to a directive for calculating an elementary trajectory, the intended trajectory being constructed gradually based on the directive contained in each of the legs, a trajectory portion making it possible to link two non-aligned elementary trajectories corresponding to two consecutive legs being termed a transition, the method comprising for at least one transition of the intended trajectory:
   1) determining an initial transition comprising at least one circular arc exhibiting a single initial turning radius that is calculated based on initial values of at least two parameters representative of a state of the aircraft, the initial values guaranteeing a flyable character of the initial transition, wherein the at least two parameters are air speed of the aircraft and wind speed,
   2) determining an initial trajectory incorporating the initial transition,
   3) determining, for each of the at least two parameters, a plurality of predicted values that the at least two parameters will be predicted to be during the initial transition, based on the determination of the initial trajectory,
   4) determining a plurality of angular subdivisions of the circular arc of the initial transition according to a predetermined criterion, the plurality of angular subdivisions being ordered with respective indices,
   5) determining, for each of the plurality of angular subdivisions a different turning radius calculated on the basis of a representative value of each of the at least two parameters for each subdivision, wherein each representative value is extrapolated on the basis of the plurality of predicted values of each of the at least two parameters in each subdivision, thus defining a plurality of ordered turning radii associated with said plurality of ordered angular subdivisions,
   6) determining an improved transition comprising said plurality of ordered turning radii continuously linked,
   7) determining an improved trajectory incorporating the improved transition, and
   8) displaying the improved trajectory to a pilot of the aircraft.

2. The method according to claim 1 wherein step 5) comprises the sub-steps of: determining a variation function of the at least two parameters as a function of an abscissa over the initial transition by an interpolation scheme, on the basis of the plurality of predicted values for each of the at least two parameters, and determining the representative value of each of the at least two parameters for each subdivision on the basis of the variation function.

3. The method according to claim 2, wherein the representative value of the at least two parameters in each subdivision is equal to an average of the variation function in each subdivision.

4. The method according to claim 1, wherein each turning radius is determined on the basis of a set of parameters comprising, in addition to the air speed of the aircraft and the wind speed, at least one additional parameter chosen from among altitude of the aircraft, temperature outside the aircraft, and/or roll angle of the aircraft.

5. The method according to claim 1, wherein the predetermined criterion is determining a number of first subdivisions, each first subdivision exhibiting an identical angular sector.

6. The method according to claim 1, wherein the predetermined criterion is determining a number of second subdivisions and an angular sector for each second subdivision as a function of the plurality of predicted values of the at least two parameters along the initial transition.

7. The method according to claim 1, wherein steps 3 to 7 are carried out in an iterative manner, an iteration being indexed j, the method further comprising a step 2') of loading a maximum number of iterations M, and
   wherein onwards of a second iteration j=2, the value of the improved transition of a previous iteration j−1 is assigned to the initial transition of a current iteration j, and the improved trajectory of the previous iteration j−1 is assigned to the initial trajectory of the current iteration j,
   the method further comprising the step of:
      5') determining at least one parameter of convergence between a current turning radius and a previous turning radius, and
      the method carrying out an additional iteration when j=1 or as a function of a comparison between the at least one convergence parameter and a predetermined threshold; and as long as j<M.

8. The method according to claim 7, wherein the at least one convergence parameter is calculated for each subdivision, the at least one convergence parameter being equal to a ratio between the current turning radius and the previous turning radius which are associated with each subdivision, the additional iteration being carried out when at least one of the at least one convergence parameter is greater than a first threshold.

9. The method according to claim 7, wherein for each subdivision a ratio is calculated between the current turning radius and the previous turning radius which are associated with each subdivision, the at least one convergence parameter being equal to an average of the ratios for the subdivisions, the additional iteration being carried out when the at least one convergence parameter is greater than a second threshold.

10. The method according to claim 1, the method being implemented although the aircraft is not yet flying the termed transition, a point of commencement of the initial transition corresponding to a point calculated by the flight management system.

11. The method according to claim 1, the method being implemented whilst the aircraft is currently flying the termed transition, a point of commencement of the initial transition corresponding to a real-time position of the aircraft.

12. The method according to claim 1, the method being triggered automatically by the flight management system, either at regular intervals or when the aircraft is currently flying the termed transition, on the basis of a detection of a disparity of position of the aircraft between a previously calculated trajectory and a trajectory flown.

13. A flight management system configured to calculate a trajectory intended to be flown by an aircraft, the intended trajectory being determined on the basis of a flight plan comprising an ordered series of legs defined by an aeronautical standard, a leg segment corresponding to a directive for calculating an elementary trajectory, the intended trajectory being constructed gradually on the basis of the directive contained in each of the legs, a trajectory portion making it possible to link two non-aligned elementary trajectories corresponding to two consecutive legs being termed a transition, the flight management system comprising: a trajectory determination module configured to determine, for at least one transition of the intended trajectory, an initial transition comprising at least one circular arc exhibiting a single initial turning radius, that is calculated on the basis of initial values of at least two parameters representative of a state the aircraft, the initial values guaranteeing a flyable character of the initial transition and to determine an initial trajectory incorporating the initial transition, wherein the at least two parameters are air speed of the aircraft and wind speed, a predictions calculation module configured to determine, for each of the at least two parameters, a plurality of predicted values that the at least two parameters will be predicted to be during the initial transition, on the basis of the determination of the initial trajectory, the trajectory calculation module furthermore being configured to determine a plurality of angular subdivisions of the circular arc of the initial transition according to a predetermined criterion, the plurality of angular subdivisions being ordered with respective indices, to determine, for each of the plurality angular subdivisions, a different turning radius calculated en the basis of a representative value of each of the at least two parameters for each subdivision, each representative value being extrapolated on the basis of the plurality of predicted values of each of the at least two parameters in each subdivision, thus defining a plurality of ordered turning radii associated with said plurality of ordered angular subdivisions, and to determine an improved transition comprising said plurality of ordered turning radii continuously linked, and an improved trajectory incorporating the improved transition, and a man machine interface configured to display the improved trajectory to a pilot of the aircraft.

14. A non-transitory, computer-readable medium comprising instructions enabling a processor to perform, for at least one transition of a trajectory arising from a flight plan intended to be flown by an aircraft for a flight management system:

1) determining an initial transition comprising at least one circular arc exhibiting a single initial turning radius that is calculated on the basis of initial values of at least two parameters representative of a state of the aircraft, the initial values guaranteeing a flyable character of the initial transition wherein the at least two parameters are air speed of the aircraft and wind speed, 2) determining an initial trajectory incorporating the initial transition, 3) determining, for each of the at least two parameters, a plurality of predicted values that the at least two parameters will be predicted to be during the initial transition, on the basis of the determination of the initial trajectory, 4) determining a plurality of angular subdivisions of the circular arc of the initial transition according to a predetermined criterion, the plurality of angular subdivisions being ordered with respective indices, 5) determining, for each of the plurality of angular subdivisions, a different turning radius calculated on the basis of a representative value of each of the at least two parameters for each subdivision, wherein each representative value is extrapolated on the basis of the plurality of predicted values of each of the at least two parameters in each subdivision, thus defining a plurality of ordered turning radii associated with said plurality of ordered angular subdivisions, 6) determining an improved transition comprising said plurality of ordered turning radii continuously linked, 7) determining an improved trajectory incorporating the improved transition, and 8) displaying the improved trajectory to a pilot of the aircraft, wherein the flight plan comprises an ordered series of legs defined by an aeronautical standard, a leg corresponding to a directive for calculating an elementary trajectory, an intended trajectory arising from the flight plan being constructed gradually on the basis of the directive contained in each of the legs, a trajectory portion making it possible to link two non-aligned elementary trajectories corresponding to two consecutive legs being termed a transition.

* * * * *

UNITED STATES PATENT AND TRADEMARK OFFICE
CERTIFICATE OF CORRECTION

PATENT NO. : 10,657,829 B2
APPLICATION NO. : 15/632205
DATED : May 19, 2020
INVENTOR(S) : Vincent Savarit et al.

It is certified that error appears in the above-identified patent and that said Letters Patent is hereby corrected as shown below:

In the Claims

In Claim 13, Column 17, Line 60, "en the basis" should be -- on the basis --.

Signed and Sealed this
Ninth Day of February, 2021

Drew Hirshfeld
*Performing the Functions and Duties of the
Under Secretary of Commerce for Intellectual Property and
Director of the United States Patent and Trademark Office*